United States Patent Office  3,313,702
Patented Apr. 11, 1967

3,313,702
ESTROGENIC COMPOSITIONS COMPRISING 17α-ETHYNYL - Δ$^{1,3,5(10)}$ - ESTRATRIENE - 3,11β,17β-TRIOL
Robert Joly, Montmorency, Julien Warnant, Neuilly-sur-Seine, and Jean Jolly, Clichy-sous-Bois, France, assignors to Roussel-UCLAF, Paris, France, a corporation of France
No Drawing. Filed June 5, 1964, Ser. No. 373,047
Claims priority, application France, June 12, 1963, 937,897; July 10, 1963, 941,005
6 Claims. (Cl. 167—74)

The present invention relates to new derivatives of estradiol as well as a process of preparation of these compounds. The invenion more particularly relates to 17α-ethynyl-Δ$^{1,3,5(10)}$-estratriene-3,11β,17β-triol (or 11β-hydroxy-17α-ethynyl-estradiol), its ethers and its esters of the general formula:

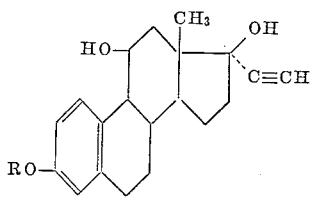

in which R represents hydrogen, acyl radical of an organic carboxylic acid or a lower alkyl radical.

An object of the present invention is the production of and 11β-hydroxylated steroid from the group consisting of compounds of the formula

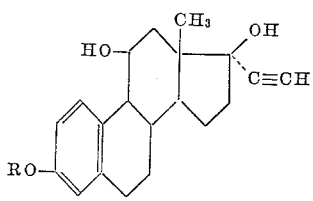

wherein R is a member selected from the group consisting of hydrogen, lower alkyl and the acyl radical of an organic carboxylic acid having from 1 to 18 carbon atoms, and particularly:

17α-ethynyl-Δ$^{1,3,5(10)}$-estratriene-3,11β,17β-triol
3-methoxy-17α-ethynyl-Δ$^{1,3,5(10)}$estratriene-11β,17β-diol
3-hexahydrobenzoyloxy-17α-ethynyl-Δ$^{1,3,5(10)}$-estratriene-11β,17β-diol.

A further object of the present invention is the development of a process for the production of an 11β-hydroxylated steroid selected from the group consisting of compounds of the formula

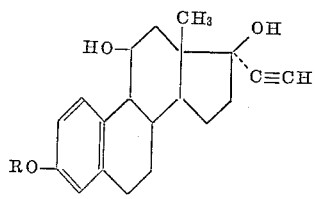

wherein R is a member selected from the group consisting of hydrogen, lower alkyl and the acyl radical of an organic carboxylic acid having from 1 to 18 carbon atoms, which comprises the steps of reacting 11β-hydroxy-estrone with an ethynylation agent in an inert organic solvent and recovering said 11β-hydroxylated steroid.

A still further object of the invention is the production of a therapeutic composition comprising a minor amount of an 11β-hydroxylated steroid selected from the group consisting of compounds of the formula

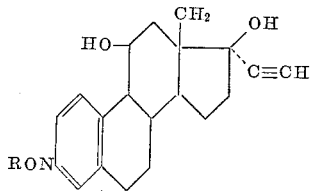

wherein R is a member selected from the group consisting of hydrogen, lower alkyl and the acyl radical of an organic carboxylic acid having from 1 to 18 carbon atoms, and a major amount of an inert toxic pharmaceutical vehicle.

A yet further object of the present invention is the development of a process for the treatment of estrogenic dificiencies at the situs of the uterus in warm-blooded animals which comprises administering to said warm-blooded animals a daily dose of from 0.3 γ/kg. to 75 γ/kg. of an 11β-hydroxylated steroid selected from the group consisting of compounds of the formula

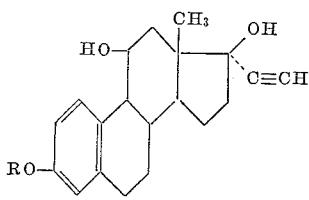

wherein R is a member selected from the group consisting of hydrogen, lower alkyl and the acyl radical of an organic carboxylic acid having from 1 to 18 carbon atoms.

These and other objects of the invention will become more apparent as the description thereof proceeds.

The products which are the objects of the invention are endowed with interesting pharmacological properties. They possess particularly an inportant estrogenic action particularly marked on the uterus while affecting the vaginal mucous membrane only to a very weak degree.

It is remarkable to note that the presence of the 11β-hydroxy group, contrary to that which one would expect, does not affect and even increases the estrogenic activity of ethynyl estradiol. According to Magerlein et al. [J.A.C.S. 1959, 80, p 2220], the estrogenic activity of various estratrienic compounds substituted in the 11 position expressed in percent of that of estradiol or that of estrone is the following:

11β-hydroxy-estradiol _____ 0.6 (percent of estradiol).
11α-hydroxy-estradiol _____ 0.05 (percent of estradiol).
Δ$^{9(11)}$-estrone _____ Very weak action.
11β-hydroxy-estrone _____ 5 (percent of estrone).

Thus the substitution in the 11 position of an estrogenic steroid leads normally to a notable weakening of the estrogenic activity of this compound. The increase of this activity, noted in the present case, was consequently unexpected and unobvious.

The process of preparation of these compounds, also an object of the present invention, is found represented by the flow diagram of Table I.

TABLE I

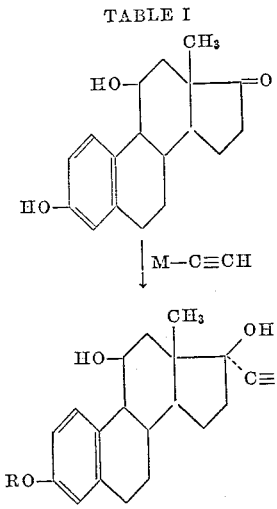

R represents hydrogen, lower alkyl or the acyl radical of an organic carboxylic acid having from 1 to 18 carbon atoms and M—C≡CH represents an ethynylation agent.

The preparation of the said compounds is principally characterized in that 11β-hydroxy-estrone, II, is subjected to the action of an ethynylation agent in the presence of an inert organic solvent. 17α-ethynyl-$\Delta^{1,3,5(10)}$-estratriene-3,11β,17β-triol (11β-hydroxy-17α-ethynyl-estradiol), I, R=H, is obtained and is transformed if desired into any desired ether or ester.

As ethynylation agents of 11β-hydroxy-estrone, II, one can employ either an alkali metal acetylide as, for example, potassium acetylide, or also a halide of ethynyl magnesium and particularly the iodide, bromide or chloride.

Any organic solvent which is inert under the reaction conditions may be employed. Particularly advantageous are aliphatic or cyclic ethers such as ethyl ether, dioxane, tetrahydrofuran, etc. The reaction occurs under customary ethynylation conditions preferably at temperatures from room temperature to reflux temperatures.

The 17α-ethynyl-$\Delta^{1,3,5(10)}$-estratriene-3,11β,17β-triol is recovered according to customary methods from the reaction solution. The triol can be etherified or esterified in the 3 position by customary methods, if desired. Lower alkyl ethers such as the 3-methoxy-, 3-propyloxy-, etc., can be prepared by reaction with the corresponding di-lower alkyl sulfate under alkaline conditions, for example. Esters in the 3 position of organic carboxylic acids having from 1 to 18 carbon atoms, such as the 3-benzoyloxy-, 3-hexahydrobenzoyloxy-, 3-acetyloxy-, etc., can be prepared, for example by reaction with the corresponding acid chloride in the presence of pyridine.

The organic carboxylic acids having from 1 to 18 carbon atoms are those of aliphatic or cycloaliphatic, saturated or unsaturated carboxylic acids or those of aromatic or heterocyclic carboxylic acids: For example, alkanoic acids, such as formic acid, acetic acid, propionic acid, butyric acid, isobutyric acid, valeric acid, isovaleric acid, trimethylacetic acid, caproic acid, β-trimethyl-propionic acid, oenanthic acid, caprylic acid, pelargonic acid, capric acid, undecylic acid, lauric acid, myristic acid, palmitic acid, stearic acid; alkenoic acids, such as undecylenic acid, oleic acid; cycloalkanoic acids, such as cyclopentyl-carboxylic acid, cyclopropyl-carboxylic acid, cyclobutyl-carboxylic acid, cyclohexyl-carboxylic acid; cycloalkyl-alkanoic acids, such as cyclopropylmethyl-carboxylic acid, cyclobutylmethyl-carboxylic acid, cyclopentylethyl-carboxylic acids, cyclohexylethyl-carboxylic acid; arylalkanoic acids, such as phenylacetic acid, phenylpropionic acid; benzoic acid; phenoxyalkanoic acids, such as phenoxyacetic acid, p-chlorophenoxyacetic acid, 2,4-dichlorophenoxyacetic acid, 4-t.-butylphenoxyacetic acid, 3-phenoxypropionic acid, 4-phenoxybutyric acid; heterocyclic-carboxylic acids, such as furane-2-carboxylic acid, 5-t.-butyl-furane-2-carboxylic acid, 5-bromofurane-2-carboxylic acid, nicotinic acid; β-ketocarboxylic acids, such as acetylacetic acid, propionylacetic acid, butyrylacetic acid; aminoacids, such as diethylaminoacetic acid, aspartic acid; etc.

The starting compound has already been described by Magerlein et al. [J.A.C.S., 1958, 80, p. 2220], but it is possible, on the other hand, to obtain 11β-hydroxy-estrone from a product obtained by total synthesis, $\Delta^{4,9}$-estradiene-11β-ol-3,17-dione (described in copending, commonly-assigned United States patent application Ser. No. 373,048, filed concurrently herewith now Pat. No. 3,282,785), which is transformed by isomerisation at elevated temperatures by the action of a catalyst having a palladium base into the above starting product as will be described further on.

It is, on the other hand, possible to prepare compounds of general Formula I starting from 17α-ethynyl-$\Delta^{1,4}$-androstadiene-11β,17β-diol-3-one which can be subjected according to known methods to a pyrolysis.

It is thus interesting to note that it is possible to effect the introduction of the ethynyl function either before or after the aromatization of ring A.

The following examples illustrate the invention without, however, limiting it. It will be obvious to those skilled in the art, however, that other expedients may be employed.

PREPARATION OF 11β-HYDROXY-ESTRONE, II 0.5 gm. of $\Delta^{4,9}$-estradiene-11β-ol-3,17-dione were introduced while agitating and under an atmosphere of nitrogen into 50 cc. of methanol. 0.25 gm. of palladium hydroxide were added and the reaction mixture was heated to reflux for a period of one hour. Next the reaction mixture was cooled to 20° C. The catalyst was removed by vacuum filtration and rinsed with methanol. The filtrate was combined and evaporated to dryness under vacuum.

0.5 gm. of product were obtained which was redissolved in 45 volumes of ethyl acetate. This solution was heated to reflux, filtered while hot and thereafter concentrated to a small volume and iced. The crystals were separated. 0.3 gm. of 11β-hydroxy-estrone, II, having a melting point of 262-263° C. and a specific rotation $[\alpha]_D^{20} = +202.5°$ (c.=0.5% in dioxane) were obtained.

The product is white and insoluble in water and slightly soluble in ether.

Example I.—Preparation of 17α-ethynyl-$\Delta^{1,3,5(10)}$-estratriene - 3,11β,17β - triol (11β - hydroxy-17α-ethynyl-estradiol) (I, with R=H)

6.3 gm. of potassium were slowly added to 90 cc. of tertiary amyl alcohol heated to 70° C. under a current of nitrogen. Then while maintaining the temperature at 70 to 80° C., the reaction mixture was agitated for a period of 30 minutes. Thereafter the reaction mixture was cooled to room temperature and 30 cc. of dioxane were added. Into this solution a stream of acetylene was bubbled for a period of an hour and a quarter. The potassium acetylide formed remained in solution. A solution of 2.6 gm. of 11β-hydroxy-estrone, II, in 50 cc. of dioxane was thereafter introduced under agitation. The temperature increased, and was allowed to return slowly to 20° C. The reaction medium was maintained for a period of 4 hours at this temperature while bubbling acetylene therethrough and removing the excess with a stream of nitrogen, all while continuing the agitation. At the end of this time, the bubbling of acetylene therethrough was stopped. 25 cc. of diluted acetic acid were added and the solution was poured into 600 cc. of water. The aqueous phases were extracted with ether. The ethereal solutions were combined and washed with a 10% aqueous solution of sodium carbonate then with water until the wash waters were neutral. The organic solution was dried over magnesium sulfate, filtered and concentrated under nitrogen. 17α-ethynyl - $\Delta^{1,3,5(10)}$ - estratriene-3,11β,17β-triol, I, with R=H, crystallized. The solution was iced and the crystals were vacuum filtered and dried. 1.9 gm. of a solid, colorless product, melting at 294° C. and having a specific rotation $[\alpha]_D^{20} = +69° \pm 1°$ (c.=1% in dioxane), were thus obtained.

*Analysis.*—$C_{20}H_{24}O_3$: molecular weight=312.39. Calculated: C, 76.89%; H, 7.74%; O, 15.36%. Found: C, 76.8%; H; 7.6%; O, 15.5%.

U. V. spectra in ethanol:

infl. $\lambda = 220$ m$\mu$ $E_{1\,cm.}^{1\%} = 218$ infl. $\lambda = 230$ m$\mu$ $E_{1\,cm.}^{1\%} = 161$ infl. $\lambda = 280$ m$\mu$ $E_{1\,cm.}^{1\%} = 60$ infl. $\lambda = 286$ m$\mu$ $E_{1\,cm.}^{1\%} = 55$ In ethanol+N/10 sodium hydroxide:

max. $\lambda = 244$ m$\mu$ $E_{1\,cm.}^{1\%} = 295$ max. $\lambda = 300$ m$\mu$ $E_{1\,cm.}^{1\%} = 85$ The ethynylation of 11β-hydroxy-estrone, II, can also be effected by the aid of a Grignard reactant. In this case, one operates as follows:

A current of methyl bromide was allowed to bubble through a suspension of 12.5 gm. of magnesium in 200 cc. of anhydrous ether at reflux. 270 cc. of tetrahydrofuran were added to 120 cc. of the solution of magnesium compound thus obtained and acetylene was allowed to bubble through the solution for a period of 3 hours. A solution of ethynyl magnesium bromide was obtained into which was introduced 1 gm. of 11β-hydroxy-estrone, II, in 40 cc. of tetrahydrofuran.

The reaction mixture was heated to reflux under an atmosphere of nitrogen for a period of 2 hours. Then, after cooling, 150 cc. of a saturated solution of ammonium chloride was added. The cooled solution was poured into water and extracted with ether.

The evaporation of the ethereal solution supplied a residue which treated as above led to 17α-ethynyl-$\Delta^{1,3,5,(10)}$-estratriene-3,11β,17β-triol, I, R=H, identical to the product described above.

*Example II.—Preparation of the methyl ether in the 3 position of 11β-hydroxy-17α-ethynyl-estradiol (I, with R=CH₃)*

11β-hydroxy-17α-ethynyl-estradiol, I, R=H, was dissolved under agitation and under an atmosphere of nitrogen in 5 volumes of 95% ethanol and 2 volumes of 2 N sodium hydroxide solution at room temperature. The reaction mixture was heated next to 50–60° C. and 2.35 mols of dimethyl sulfate were rapidly introduced. After 3 minutes of agitation, three additional amounts of 2 N sodium hydroxide solution and of dimethyl sulfate were added. Finally, one volume of 2 N sodium hydroxide solution was added and the reaction mixture was agitated for a further 15 minutes. Thereafter, the reaction mixture was diluted with iced water. The precipitate was vacuum filtered and dried. The methyl ether in the 3 position of 11β-hydroxy-17α-ethynyl-estradiol or 3-methoxy - 17α - ethynyl - $\Delta^{1,3,5(10)}$ - estratriene-11β,17β-diol, I, R=CH₃ was obtained.

*Example III.—Preparation of the 3 - hexahydrobenzoate of 11β - hydroxy - 17α - ethynyl - estradiol (I, with R=COC₆H₁₁)*

11β-hydroxy-17α-ethynyl-estradiol, I, R=H, was dissolved in 5 volumes of pyridine. 1.5 volumes of hexahydrobenzoyl chloride were added to the cold solution while agitating and the reaction mixture was allowed to stand for 24 hours at room temperature. Next some water was added and the solution was extracted with chloroform. The chloroformic solution was dried, filtered and the chloroform was removed. The 3-hexahydrobenzoate of 11β-hydroxy - 17α - ethynyl-estradiol or 3-hexahydrobenzoyloxy - 17α - ethynyl - $\Delta^{1,3,5(10)}$ - estratriene - 11β,17β-diol, I, R=COC₆H₁₁, was obtained.

As has been indicated above, the products which are the objects of the invention are endowed with interesting pharmacological properties. They possess particularly an important estrogenic action which is particularly marked on the uterus of warm-blooded animals while affecting the vaginal mucous membrane only to a weaker degree. They can be utilized for the treatment in warm-blooded animals of amenorrhea, hypomenorrhea, luteinic insufficiencies, repeated abortions, prementrual disturbances and menopause.

17α-ethynyl-$\Delta^{1,3,5(10)}$-estratriene-3,11β,17β-triol, its esters and its ethers of the general Formula I are utilized orally, perlingually, transcutaneously and by topical applications or by rectal applications.

They can be prepared in the form of injectable solutions or suspensions, prepared in ampules or in multiple-dose flacons; in the form of implants; of tablets; of glossettes; of suppositories; of ovules; and of pomades.

The useful dosology is controlled between 0.3 γ/kg. and 75 γ/kg. per day in the warm-blooded animal as a function of the method of administration.

The pharmaceutical forms such as injectable suspensions, implants, tablets, glossettes, suppositories, ovules and pomades are prepared according to the usual processes.

The unitary dose is comprised between 0.01 mg. and 0.5 mg.

*Example IV.—Pharmacological study*

*Estrogenic activity.*—The estrogenic activity of 17α-ethynyl-$\Delta^{1,3,5(10)}$-estratriene-3,11β,17β-triol was studied according to the test of the weight of the uterus.

*Test of the weight of the uterus.*—The product was utilized in solution in olive oil containing 5% of benzyl alcohol and was administered orally to a lot of immature female rats 22 to 23 days old at total doses of 0.125, 0.375 and 1.125 gammas, divided into six administrations. These doses were administered twice a day for a period of three days. The activity of the product was determined by comparison with ethynyl estradiol administered equally by oral methods at the same doses in olive oil containing 5% of benzyl alcohol. The animals were sacrificed and autopsied the fourth, day, 72 to 75 hours after the first administration. The uteri of the animals were separated and weighed. The following table gives the results obtained:

TABLE II

| 17α-ethynyl-estradiol | | 17α-ethynyl-$\Delta^{1,3,5(10)}$-estratriene-3,11β,17β-triol | |
|---|---|---|---|
| Doses administered, γ | Weight of uterus, mg. | Doses administered, γ | Weight of uterus, mg. |
| 0.125 | 26.23 | 0.125 | 28.14 |
| 0.375 | 36.92 | 0.375 | 58.48 |
| 1.125 | 79.69 | 1.125 | 87.46 |

It can be seen from this table that 17α-ethynyl-$\Delta^{1,3,5(10)}$-estratriene-3,11β,17β-triol possesses an estrogenic activity based on the test of the weight of the uterus varying between 110% and 160% of that of ethynyl-estradiol.

*Allen-Doisy test.*—This test for estrogenic activity was effected on a lot of castrated female rats weighing 140 gm.±20 gm., divided into groups of four. The product in aqueous suspension, at concentrations of 100γ and 1,000γ per cc., was administered orally in a volume of 1 cc. per rat. Vaginal smears were taken each day starting from the second day. Only those smears formed exclusively of keratinized cells were retained as positive.

The following results were obtained: at 100γ, no estrus; at 1,000γ, three cases of estrus out of six.

A second test was made in comparison with ethynyl-estradiol. The medicine studied was administered orally to lots of castrated female rats in suspension in olive oil containing 5% of benzyl alcohol at concentrations of 50γ per cc. and 500γ per cc. and in suspension in carboxymethyl cellulose at the same concentrations. Ethynyl-estradiol was administered in solutions in olive oil containing 5% of benzyl alcohol at concentrations of 50γ per cc. Each animal received 1 cc. of solution or of suspension.

The following table gives the results obtained.

TABLE III

|  | Doses, γ | 17α-ethynyl-$\Delta^{1,3,5(10)}$-estratriene-3,11β,17β-triol | | 17α-ethynyl-estradiol |
|---|---|---|---|---|
|  |  | In solution in olive oil +5% benzyl alcohol | In suspension in carboxymethyl cellulose | In solution in olive oil +5% benzyl alcohol |
| Number of estri observed. | 50 | 1/6 | 0/6 | 3/6 |
|  | 500 | 6/6 | 5/6 | |

It can thus be seen that according to this test of estrogenic activity primarily on the situs of the vaginal mucous membrane, the medicine studied is clearly weaker than that of ethynyl-estradiol at 50γ per cc., but effective at 500γ per cc.

*Determination of toxicity.*—17α-ethynyl-$\Delta^{1,3,5(10)}$-estratriene-3,11β,17β-triol in suspension in an aqueous dispersant solute was administered orally to a lot of ten female mice of the Rockland strain weighing about 20 gm. in a volume of 0.4 cc. per mouse and at a dose of 50 mg./kg.

After 8 days of observation, no mortality nor symptomatology was observed.

The product is thus well tolerated in acute administration at a dose of 50 mg. per kg. administered to mice orally.

It is to be understood that the invention is not to be limited to the above specific embodiments. Other expedients known to those skilled in the art may be employed without departing from the spirit of the invention and the scope of the appended claims.

We claim:
1. An 11β-hydroxylated steroid selected from the group consisting of compounds of the formula

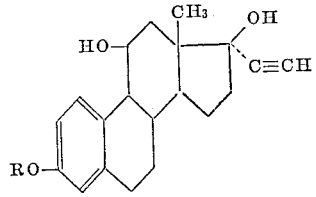

wherein R is a member selected from the group consisting of hydrogen, lower alkyl and the acyl radical of an organic carboxylic acid having from 1 to 18 carbon atoms.

2. 17α-ethynyl-$\Delta^{1,3,5(10)}$-estratriene-3,11β,17β-triol.

3. 3-methoxy-17α-ethynyl-$\Delta^{1,3,5(10)}$-estratriene-11β,17β-diol.

4. 3-hexahydrobenzoyloxy-17α-ethynyl-$\Delta^{1,3,5(10)}$-estratriene-11β,17β-diol.

5. A therapeutic composition comprising a minor amount of an 11β-hydroxylated steroid selected from the group consisting of compounds of the formula

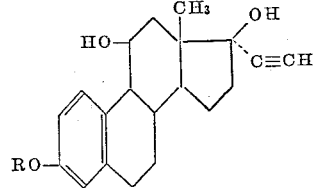

wherein R is a member selected from the group consisting of hydrogen, lower alkyl and the acyl radical of an organic carboxylic acid having from 1 to 18 carbon atoms, and a major amount of an inert non-toxic pharmaceutical vehicle.

6. A process for the treatment of estrogenic deficiencies at the situs of the uterus in warm-blooded animals which comprises administering to said warm-blooded animals a daily dose of from 0.3γ/kg. to 75γ/kg. of an 11β-hydroxylated steroid selected from the group consisting of compounds of the formula wherein R is a member selected from the group consisting of hydrogen, lower alkyl and the acyl radical of an organic carboxylic acid having from 1 to 18 carbon atoms.

References Cited by the Examiner

Magerlein et al.: "J.A.C.S." (1958), volume 80, pp. 2220–2222.

Robinson et al.: Journal Org. Chem. (1963), vol. 28, pp. 975–977.

Veberwasser et al.: "Helvetica Chimica Acts" (1963), pp. 344–351.

LEWIS GOTTS, *Primary Examiner.*

ELBERT L. ROBERTS, *Examiner.*